No. 793,976. PATENTED JULY 4, 1905.
E. W. ARMENTROUT.
SILO.
APPLICATION FILED AUG. 11, 1904.
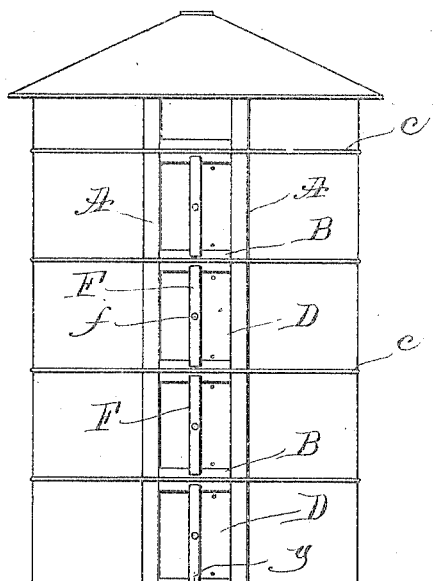
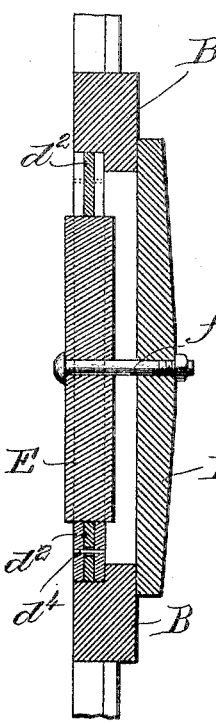
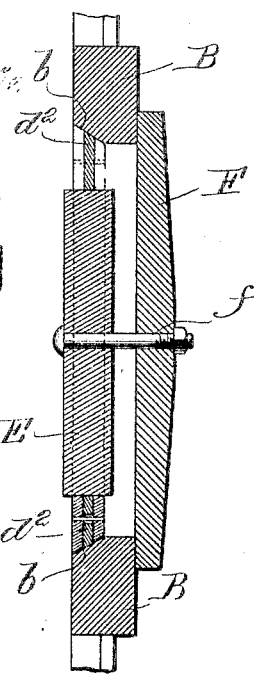
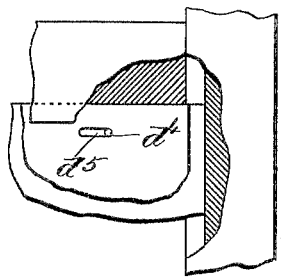
Witnesses.
Thomas L. Drummond.
W. C. Lunsford.
Inventor.
Eugene W. Armentrout,
by Crosby Gregory.
Attys.

No. 793,976. Patented July 4, 1905.

UNITED STATES PATENT OFFICE.

EUGENE W. ARMENTROUT, OF APALACHICOLA, FLORIDA, ASSIGNOR TO THE CYPRESS LUMBER COMPANY, OF BOSTON, MASSACHUSETTS, A CORPORATION OF MAINE.

SILO.

SPECIFICATION forming part of Letters Patent No. 793,976, dated July 4, 1905.

Application filed August 11, 1904. Serial No. 220,367.

*To all whom it may concern:*

Be it known that I, EUGENE W. ARMENTROUT, a citizen of the United States, residing at Apalachicola, county of Franklin, State of Florida, have invented an Improvement in Silos, of which the following description, in connection with the accompanying drawings, is a specification, like letters on the drawings representing like parts.

This invention relates particularly to silos designed for the holding of ensilage, but is equally applicable to any tank-like structure for holding any sort of material in which an opening or openings are provided in the wall for the admission or removal of the contents.

The invention particularly relates to the structure of the opening in the wall of the silo or tank and is herein shown as applied to a round or cylindrical silo or tank, although it is equally applicable to silos or tanks of other cross-section than cylindrical. In structures of this class it is highly desirable, if not essential, to provide a closure for the opening or openings in the wall which shall be practically air-tight, so that the contents, particularly in the case of ensilage, will not be impaired by fermentation caused from contact with the atmosphere.

Various styles of openings have been in use; but they may generally be divided into two classes—first, a series of vertically-alined small openings running substantially from the top to the bottom of the silo; second, one long continuous opening running substantially from the top to the bottom of the silo. In both cases these openings are closed by a series of doors or door-like closures. Each of these constructions has its advantages.

The present invention relates to that type wherein a series of openings are provided, herein shown as vertically alined in accordance with the usual custom, although such vertical alinement is of course not essential.

The drawings represent a silo of the cylindrical type provided with the improved door construction of this invention.

Figure 1 is a view in front elevation of a cylindrical silo, showing a series of openings vertically alined and provided with the improved door construction of this invention. Fig. 2 is a cross-section on the line $x\,x$ of Fig. 1 through the door-jambs and door. Fig. 3 is a cross-section on the line $y\,y$ of Fig. 1, showing one of the doors. Fig. 4 is a view similar to Fig. 3 of another form of door construction, and Fig. 5 is a detail showing the construction of the door.

The silo herein shown is built in the usual and common manner, of cylindrical form and provided with two door-jambs A A running vertically the length of the silo, which door-jambs are kept separated by braces B B, which braces on their exterior surfaces preferably conform to the cylindrical surface of the silo. The silo is held together by hoops or bands C C, which pass over the braces B B in the usual and common manner. The door-jambs A and the braces B together form a series of rectangular openings throughout the length of the silo, serving for the removal and admission of its contents.

For the purpose of the present invention, as will appear, it is necessary that the opposite walls of each opening shall be provided with cam-surfaces, swelling from the ends toward the middle, and for this purpose use is made of the braces B, which already have these cam-shaped surfaces by reason of their conformation to the cylindrical surface of the silo. Each opening is provided with an expansible door D. This door is formed of two parts, herein shown as vertically arranged, although the arrangement might as well be horizontal. These parts $d\,d'$ are fitted to slide one upon the other and are separated by a wedge E. As a means for allowing one door part to slide upon the other, one part, as $d$, is shown provided with a fin $d^2$ fastened thereto and sliding freely in a slot $d^3$ in the other part $d'$. This fin-and-slot connection is used at opposite ends of the door.

In order to prevent one door part from separating from the other, the part in which the groove $d^3$ is located has a small guide-pin $d^4$ fast therein and passing through a slot $d^5$ in the fin $d^2$ of sufficient extent to allow for the expansion and contraction of the door. It will thus be seen that when the wedge E is pulled in between the parts d d' of the door they will be separated and the door expanded. In order to secure this expansion, a cross-bar F is pivotally mounted, as by means of a bolt f, at the center of the wedge E and extends out through the silo-opening and is of sufficient length to have its ends rest upon opposite walls of the opening, as on the braces B B.

In Fig. 4 the braces B are shown as oppositely beveled at b, and the corresponding edges of the door are shown as similarly beveled. In Fig. 3 no such bevel is provided.

In the operation of the door the cross-bar F is turned to the position shown in dotted lines in Fig. 1, the parts of the door are brought together, the wedge E being retracted. The door is then placed in the opening from the interior of the silo and the cross-bar F turned so that its ends will rise up on the cam-surfaces at the opposite sides of the door-opening, as on the swelling surfaces of the braces B. This operation, proper adjustment being secured by the nut on the pivot-bolt f, serves to draw the wedge E in tightly between the parts of the door and to expand the door so that it tightly fits the walls of the opening. The bevel-shaped opposite edges b of the door-jambs above described should, if used, be placed on the edges of the door at right angles with the wedge E. When the cross-bar F is turned to expand the door, it will then at the same time draw the beveled edges of the door tightly against the beveled edges of the opening and serve, if properly adjusted, even more effectually to close the opening; but as a practical matter the construction shown in Fig. 3, where these bevels are not provided, will usually be found to be sufficient. This expansible door will be found to be simple in operation, easily placed in position, and an effectual and tight closure.

While I have shown and described a particular construction, this invention is not limited to the details so shown and described.

For convenience the term "silo" as descriptive of the structure has been used in the claims; but, as already stated, by this term is meant any shaped silo or any similar tank-like structure the walls of which are to be provided with openings for the admission and removal of the contents.

Having described my invention, what I claim as new, and desire to secure by Letters Patent, is—

1. A silo having an opening, cam-surfaces on opposite sides of the exterior of said opening, a two-part expansible door for said opening, a wedge for separating the two parts of the door to expand the same, a cross-bar pivoted to said wedge and adapted to have its ends ride over the cam-surfaces of the door-opening and thus expand the door and hold it in position.

2. A silo having an opening in its wall, an expansible door therefor comprised of two parts slidingly connected, a wedge for separating the two parts, means for operating the said wedge to separate the parts, said operating means acting to hold the expanded door in position in the opening.

3. A silo having an opening in its wall provided with an opposite interior pair of beveled edges, an expansible door therefor comprised of two parts slidingly connected and provided with bevels on opposite edges, a wedge for separating the two parts, means for operating the said wedge to separate the parts, said operating means acting to hold the expanded door in position in the opening.

In testimony whereof I have signed my name to this specification in the presence of two subscribing witnesses.

EUGENE W. ARMENTROUT.

Witnesses:
J. H. COOK,
M. L. PATTON.